(12) United States Patent
Kataoka et al.

(10) Patent No.: US 12,119,757 B2
(45) Date of Patent: Oct. 15, 2024

(54) POWER SUPPLY SYSTEM INCLUDING A PLURALITY OF POWER CONVERSION DEVICES TO SUPPLY AC OR DC POWER

(71) Applicant: Mitsubishi Electric Corporation, Tokyo (JP)

(72) Inventors: Takuya Kataoka, Tokyo (JP); Kikuo Izumi, Tokyo (JP); Yusuke Higaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 147 days.

(21) Appl. No.: 17/802,141

(22) PCT Filed: Apr. 21, 2020

(86) PCT No.: PCT/JP2020/017133
§ 371 (c)(1),
(2) Date: Aug. 25, 2022

(87) PCT Pub. No.: WO2021/214851
PCT Pub. Date: Oct. 28, 2021

(65) Prior Publication Data
US 2023/0072540 A1    Mar. 9, 2023

(51) Int. Cl.
*H02M 7/08* (2006.01)
*H02J 3/46* (2006.01)
*H02M 1/00* (2007.01)

(52) U.S. Cl.
CPC ............... *H02M 7/08* (2013.01); *H02J 3/46* (2013.01); *H02M 1/0006* (2021.05)

(58) Field of Classification Search
CPC ........... H02M 1/0006; H02M 7/08; H02J 3/46
See application file for complete search history.

(56) References Cited

U.S. PATENT DOCUMENTS

2010/0327655 A1   12/2010   Okamoto et al.
2018/0358907 A1*  12/2018   Kato ................. H02M 7/53875
(Continued)

FOREIGN PATENT DOCUMENTS

| CN | 112840520 A | * | 5/2021 | ............... G05F 1/67 |
| EP | 4142132 A1 | * | 3/2023 | ............... H02J 1/08 |

(Continued)

OTHER PUBLICATIONS

International Search Report and Written Opinion mailed on Jul. 14, 2020, received for PCT Application PCT/JP2020/017133, filed on Apr. 21, 2020, 8 pages including English Translation.

(Continued)

*Primary Examiner* — Sisay G Tiku
(74) *Attorney, Agent, or Firm* — XSENSUS LLP (57) ABSTRACT

A power supply system includes a plurality of power conversion devices connected in parallel with each other, a load state detector to detect an operating state of a load connected to the DC system, and a command generator to generate a distribution voltage command Vref. Each of the power conversion devices includes a DC voltage controller to generate an output power command Pdc_ref based on a voltage of the DC system and the distribution voltage command Vref, and an AC/DC converter to convert AC power received from the main power source based on the output power command Pdc_ref and output the converted power to the DC system. The command generator generates the distribution voltage command Vref such that loss of the load connected to the DC system is reduced, based on a detection result of the load state detector.

13 Claims, 10 Drawing Sheets

(56) References Cited

U.S. PATENT DOCUMENTS

| | | | |
|---|---|---|---|
| 2019/0157979 A1* | 5/2019 | Higaki | H02M 3/1586 |
| 2020/0204057 A1* | 6/2020 | Kato | H02M 7/53871 |
| 2021/0203258 A1* | 7/2021 | Umezu | H02P 9/06 |
| 2022/0014018 A1* | 1/2022 | Higaki | H02J 1/082 |
| 2022/0158568 A1* | 5/2022 | Uda | H02M 1/0025 |
| 2022/0181879 A1* | 6/2022 | Kataoka | G05B 15/02 |
| 2023/0170703 A1* | 6/2023 | Higaki | H02M 3/33573 |
| | | | 363/13 |

FOREIGN PATENT DOCUMENTS

| | | | | |
|---|---|---|---|---|
| JP | H11113175 A | * | 4/1999 | |
| JP | 3419443 B2 | | 6/2003 | |
| JP | 2009-232674 A | | 10/2009 | |
| JP | 2010-158098 A | | 7/2010 | |
| JP | 5092997 B2 | | 12/2012 | |
| JP | 2017-127195 A | | 7/2017 | |
| JP | 2018029408 A | * | 2/2018 | |
| JP | 6605186 B1 | * | 11/2019 | H02J 1/082 |
| JP | WO2019016991 A1 | * | 3/2020 | |
| WO | WO-2017126205 A1 | * | 7/2017 | H02M 1/126 |

OTHER PUBLICATIONS

Extended European Search Report issued May 2, 2023 in corresponding European Patent Application No. 20931863.3, 9 pages.

* cited by examiner

POWER SUPPLY SYSTEM INCLUDING A PLURALITY OF POWER CONVERSION DEVICES TO SUPPLY AC OR DC POWER

CROSS-REFERENCE TO RELATED APPLICATION

The present application is based on PCT filing PCT/JP2020/017133, filed Apr. 21, 2020, the entire contents of which are incorporated herein by reference.

TECHNICAL FIELD

The present disclosure relates to a power supply system including a plurality of power conversion devices connected in parallel.

BACKGROUND ART

Storage battery facilities have been increasingly used to make use of renewable energy and cope with power failures. For example, a DC power supply and distribution system that supplies and distributes DC power is used as a power supply system used in application of solar power generation and storage batteries. In a power supply system such as a DC supply and distribution system, power converters are sometimes connected in parallel to increase device capacity. However, when power converters are connected in parallel, the magnitudes of output currents of the power converters may become unbalanced and, if the unbalance increases, the operation of the power converters may become unstable.

To cope with this, for example, Japanese Patent No. 3419443 (PTL 1) discloses a power supply system that suppresses unbalance in output current by correcting the operation of power converters, based on a voltage control signal composed of an error signal comparing a voltage detection value of a load with a reference voltage oscillation of each power converter and an unbalance detection value calculated from output current of each power converter.

DC power supply and distribution systems are advantageous in that the number of times of power conversion is reduced and cost efficiency is improved because DC power output from a DC power source need not be converted into AC power. Furthermore, DC voltage output from the DC power supply and distribution systems has no fixed standards and has flexibility. Systems for outputting DC power suitable for each load device have been proposed.

For example, Japanese Patent No. 5092997 (PTL 2) proposes a power supply system including a current detector to detect current consumption of a load circuit receiving a predetermined power supply voltage and having a plurality of load states, in which an optimum DC voltage depending on the states of output current of the load is supplied based on the current consumption detected by the current detector and the predetermined power supply voltage.

CITATION LIST

Patent Literature

PTL 1: Japanese Patent No. 3419443
PTL 2: Japanese Patent No. 5092997

SUMMARY OF INVENTION

Technical Problem

However, in Japanese Patent No. 3419443 (PTL 1), it is necessary to provide each power converter with a communication interface for communicating information such as output currents of the power converters connected in parallel between a plurality of power conversion devices, leading to increase in size and weight of the power conversion devices.

In the DC/DC converter disclosed in Japanese Patent No. 5092997 (PTL 2), it is necessary to prepare a data table indicating the relation of power supply voltages of the load, and when the kinds of connected loads are not fixed, power consumption of the load is unable to be appropriately reduced.

The present disclosure is made to solve the problem above, and an object of the present disclosure is to provide a power supply system including a plurality of power conversion devices connected in parallel, in which power consumption of loads is reduced without performing communication between the power conversion devices.

Solution to Problem

A power supply system according to the present disclosure converts power received from a main power source to supply AC power or DC power and outputs the converted power to a DC system. This power supply system includes a plurality of power conversion devices provided between the main power source and the DC system and connected in parallel with each other, a state detector to detect an operating state of at least one load connected to the DC system, and a command generator to generate a voltage command that is a command value of voltage distributed from the power supply system to the DC system. Each of the power conversion devices includes a voltage controller to generate a power command based on a voltage of the DC system and the voltage command and a converter to convert power received from the main power source based on the power command and output the converted power to the DC system. The command generator generates the voltage command such that loss of at least one load connected to the DC system is reduced, based on a detection result of the state detector.

Advantageous Effects of Invention

According to the present disclosure, in a power supply system including a plurality of power conversion devices connected in parallel, power consumption of loads is reduced without performing communication between the power conversion devices.

DESCRIPTION OF EMBODIMENTS

Embodiments of the present disclosure will be described in detail below with reference to the drawings. Like or corresponding parts in the drawings are denoted by like reference signs and a description thereof is not repeated.

First Embodiment

<Configuration of Power Supply System>

Figure 1:
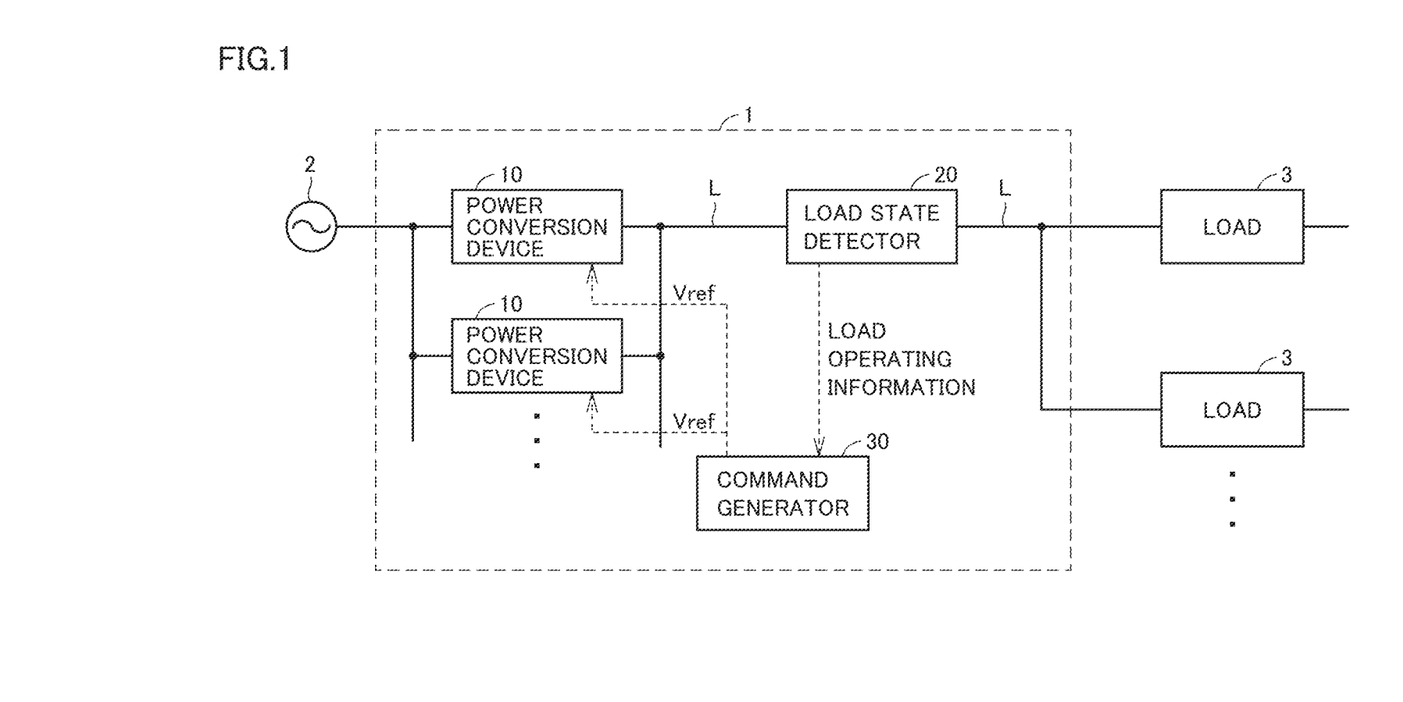
FIG. 1 is a first diagram schematically showing an exemplary configuration of a power supply system.

FIG. 1 is a diagram schematically showing an exemplary configuration of a power supply system 1 according to the present embodiment. Power supply system 1 is connected to a main power source 2 and a plurality of loads 3. Although FIG. 1 shows an example in which main power source 2 is an AC system power source, main power source 2 may be a DC power source. The number of loads 3 is not necessarily more than one and may be one.

Power supply system 1 supplies power received from main power source 2 to a plurality of loads 3 connected to a DC system L. Power supply system 1 includes a plurality of power conversion devices 10, a load state detector 20, and a command generator 30.

Each power conversion device 10 converts power received from main power source 2 into DC power based on a distribution voltage command Vref from command generator 30 and outputs the converted DC power to DC system L. Distribution voltage command Vref is a command value of voltage distributed from power supply system 1 to DC system L.

Load state detector 20 detects a state (voltage, current, etc.) of DC system L connected to a plurality of loads 3 as an operating state of loads 3 and outputs the detection result as load operating information to command generator 30.

Command generator 30 calculates distribution voltage command Vref for each power conversion device 10 in accordance with a state of loads 3 detected by load state detector 20 and outputs the calculated distribution voltage command Vref to the corresponding power conversion device 10. In the present embodiment, command generator 30 calculates distribution voltage command Vref every predetermined update cycle. Distribution voltage command Vref output from command generator 30 therefore may vary stepwise every predetermined update cycle.

Power supply system 1 according to the present embodiment is a power supply and distribution system that supplies and distributes DC power. In the present embodiment, main power source 2 is an AC system power source, and power supply system 1 converts AC power from main power source 2 into DC power with power conversion devices 10 and supplies the DC power to DC system L. Main power source 2 may be a DC system, and a DC/DC converter may be used for power conversion device 10.

The kinds of loads 3 connected to DC system L are classified into, for example, general loads such as lighting loads and office automation devices and power loads such as air conditioning loads. When power supply system 1 is applied to factories, the power loads include factory power loads such as conveyors and press machines.

The power loads including at least general power loads and factory power loads significantly differ in operating characteristics from the general loads including lighting loads, and input voltage characteristics in which power efficiency in loads is highest differ depending on individual operating states. Supplying a suitable distribution voltage according to the kinds of loads facilitates improvement of power distribution efficiency. It is therefore preferable that a plurality of loads 3 connected to DC system L are of the same kind of loads, if possible.

<Configuration and Operation of Power Conversion Device>

Figure 2:
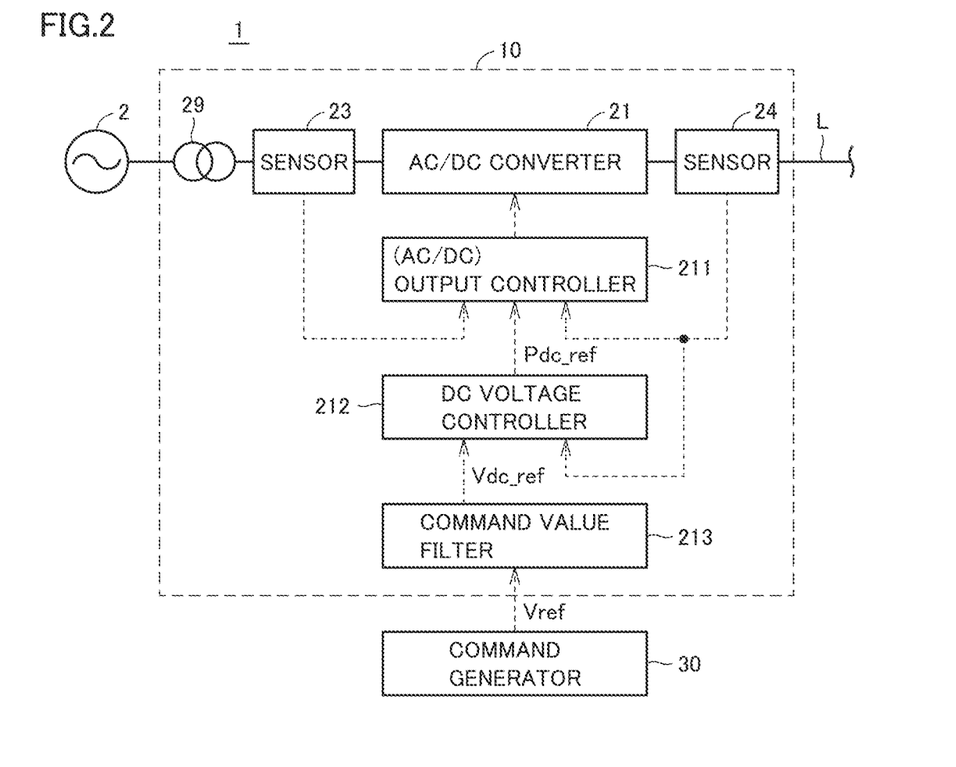
FIG. 2 is a first diagram schematically showing an exemplary configuration of a power conversion device.

FIG. 2 is a diagram schematically showing an exemplary configuration of power conversion device 10. Power conversion device 10 includes an AC/DC converter 21, sensors 23 and 24, a transformer 29, an output controller 211, a DC voltage controller 212, and a command value filter 213.

Transformer 29 is provided between main power source 2 and AC/DC converter 21 and insulates main power source 2 from AC/DC converter 21. In the present embodiment, assuming that main power source 2 is an AC system, transformer 29 is provided in power conversion device 10. However, when a power receiving transformer provides insulation from the outside or when insulation from an AC system is not required, transformer 29 can be eliminated.

AC/DC converter 21 is provided between transformer 29 and DC system L, converts AC power from main power source 2 into DC power, and outputs the converted DC power to DC system L.

Sensor 23 is provided between transformer 29 and AC/DC converter 21, detects voltage and current of AC power supplied from main power source 2 to AC/DC converter 21, and outputs the detection result to output controller 211.

Sensor 24 is provided on DC system L, detects voltage Vdc and current on DC system L, and outputs the detection result to output controller 211 and DC voltage controller 212.

Command value filter 213 performs a filter process (low-pass filter process) on distribution voltage command Vref from command generator 30 and outputs distribution voltage command Vdc_ref after the filter process to DC voltage controller 212. As described above, distribution voltage command Vref output from command generator 30 may vary stepwise every predetermined update cycle. When the variation range of distribution voltage command Vref is large, an overshoot may occur in voltage on DC system L due to the operation of power conversion device 10. Insertion of a low-pass filter to distribution voltage command Vref in command value filter 213 therefore suppresses an abrupt change of voltage on DC system L. The time constant of the low-pass filter is adjusted and set in advance in accordance with the control characteristics (specifications) of power conversion device 10. When the control response of AC/DC converter 21 is small and there is no concern of overshoot, command value filter 213 can be eliminated.

DC voltage controller 212 generates an output power command Pdc_ref for AC/DC converter 21 in accordance with voltage Vdc on DC system L detected by sensor 24 and distribution voltage command Vdc_ref after the filter process input from command value filter 213. Output power command Pdc_ref is a command value of output power of AC/DC converter 21. DC voltage controller 212 outputs the generated output power command Pdc_ref to output controller 211.

Figure 3:
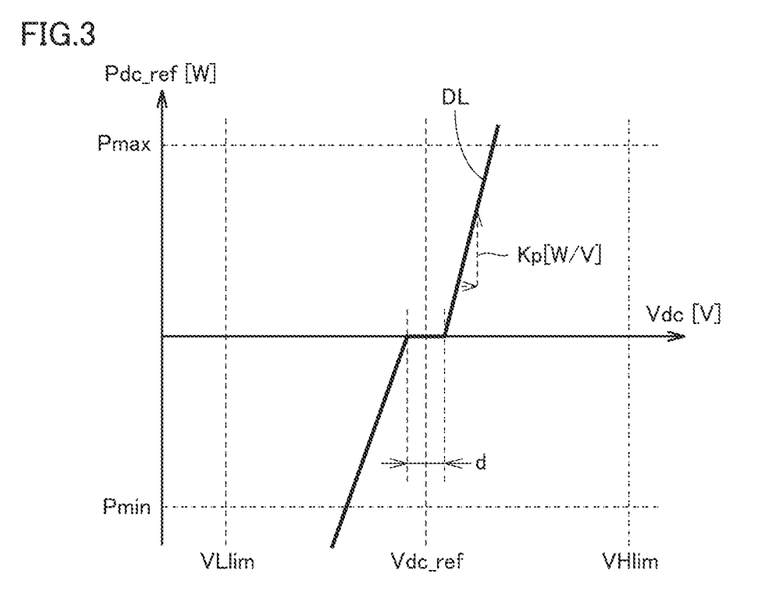
FIG. 3 is a diagram illustrating control characteristics in a DC voltage controller.

FIG. 3 is a diagram illustrating control characteristics in DC voltage controller 212. In FIG. 3, the horizontal axis is voltage Vdc (in volts) on DC system L, and the vertical axis is output power command Pdc_ref (in watts).

DC voltage controller 212 sets droop characteristics that define the characteristics of output power command Pdc_ref for voltage Vdc of DC system L, based on distribution voltage command Vdc_ref after the filter process, in which voltage Vdc of DC system L is an input signal and output power command Pdc_ref is an output signal. Specifically, DC voltage controller 212 sets a droop characteristics line DL with a slope Kp having a dead zone having a width d in which distribution voltage command Vdc_ref after the filter process is at the center, as shown in FIG. 3. Output power command Pdc_ref in the dead zone of droop characteristics line DL is set to zero. Distribution voltage command Vdc_ref after the filter process of the same value is specified in a plurality of power conversion devices 10.

Here, slope Kp of droop characteristics line DL is preset based on the specifications of power conversion device 10, such as the rated operating range and the protection threshold of power conversion device 10, and stored in a not-shown memory. Width d of the dead zone of droop characteristics line DL is preset to a value in accordance with the amount of variation in detection values from sensors 23 and 24 and stored in a not-shown memory. DC voltage controller 212 sets droop characteristics line DL as shown in FIG. 3, using distribution voltage command Vdc_ref after the filter process input from command value filter 213 and slope Kp and width d of the dead zone stored in the memory.

DC voltage controller 212 then refers to droop characteristics line DL set as described above and generates output power command Pdc_ref corresponding to voltage Vdc detected by sensor 24. In the present embodiment, the droop characteristics in which the output signal is output power command Pdc_ref as shown in FIG. 3 are used. However, the droop characteristics in which the output signal is an output current command value may be used.

Returning to FIG. 2, output controller 211 controls the operation of AC/DC converter 21, based on the detection results by sensors 23 and 24 and output power command Pdc_ref from DC voltage controller 212. In doing so, when output power command Pdc_ref exceeds a preset control range from a power minimum value Pmin to a power maximum value Pmax, output power command Pdc_ref is set to a value within the control range. This prevents device destruction and the like due to overcurrent.

The unbalance in output power among a plurality of power conversion devices 10 connected in parallel is often caused by variations in sensor detection value of each of power conversion devices 10 and variations in line impedance between DC system L and power conversion device 10.

When DC voltage controller 212 is mounted to generate output power command Pdc_ref using the droop characteristics shown in FIG. 3, unbalance of output power occurs to some extent, but the amount of unbalance can be suppressed, thereby preventing unstable operation and the like. In this case, the amount of unbalance steadily converges to a constant value based on variations in voltage detection value occurring among a plurality of power conversion devices 10 and the droop characteristics shown in FIG. 3. In particular, variations in voltage detection value are determined by detection accuracy of sensors 23 and 24 and a voltage drop amount in line impedance and are generally as small as approximately 1 to 5%. Therefore, the amount of output unbalance among a plurality of power conversion devices 10 can be restricted to an acceptable magnitude by setting the droop characteristics in line with the worst case of variations. That is, DC voltage controller 212 that generates output power command Pdc_ref using the droop characteristics shown in FIG. 3 can be used to level out the output power while suppressing the amount of unbalance in output power among a plurality of power conversion devices 10.

In addition, since DC voltage controller 212 according to the present embodiment performs control of DC system L only with information from sensors 23 and 24 included in power conversion device 10 itself, there is no need for constructing a high-speed communication interface with another power conversion device 10.

Furthermore, DC voltage controller 212 is configured to have a dead zone with width d in the droop characteristics in order to suppress cross current (current circulating between power conversion devices 10) caused by variations (errors) in detection value by sensors 23 and 24. Supposing that variations in detection value occur in a case with no dead zone, DC power command values having positive polarity and having negative polarity may be mixed in each power conversion device 10, causing cross current. Since cross current itself is irrelevant to the work of a load, power loss caused by cross current is unnecessary. However, in DC voltage controller 212 according to the present embodiment, the amount of variations in detection value is assumed and a dead zone with width d corresponding to it is preset. This suppresses occurrence of cross current.

<Operation of Command Generator>

A DC power supply and distribution system like power supply system 1 according to the present embodiment is more flexible in the value of output voltage of DC power than an AC power supply and distribution system with a standardized output voltage. Thus, the power efficiency may be improved by changing the voltage of DC power in accordance with a state of loads. However, it is preferable that the voltage of DC power falls within an acceptable range set for each load so as not to inhibit the operation of the load. The acceptable range of voltage input to the load may vary based on an operating state of the load.

In view of these, command generator 30 according to the present embodiment determines and generates distribution voltage command Vref based on load operating information acquired by load state detector 20 such that power consumption of a plurality of loads 3 is minimized or the power efficiency of a plurality of loads 3 is optimized.

Power consumption of load 3 can be represented by a sum of power consumption consumed in work in a main functional part of load 3 and loss occurring in a power supply circuit and an input interface of load 3. In particular, power consumed in the main functional part of load 3 varies with a load command. Power consumption of the main functional part therefore hardly changes if a load operation command is a constant value. Based on this, command generator 30 according to the present embodiment adjusts distribution voltage command Vref such that power loss in the power supply circuit and the input interface of load 3 decreases in a period in which the load operation command does not vary. This can reduce power consumption of load 3 and enables improvement of cost efficiency.

Figure 4:
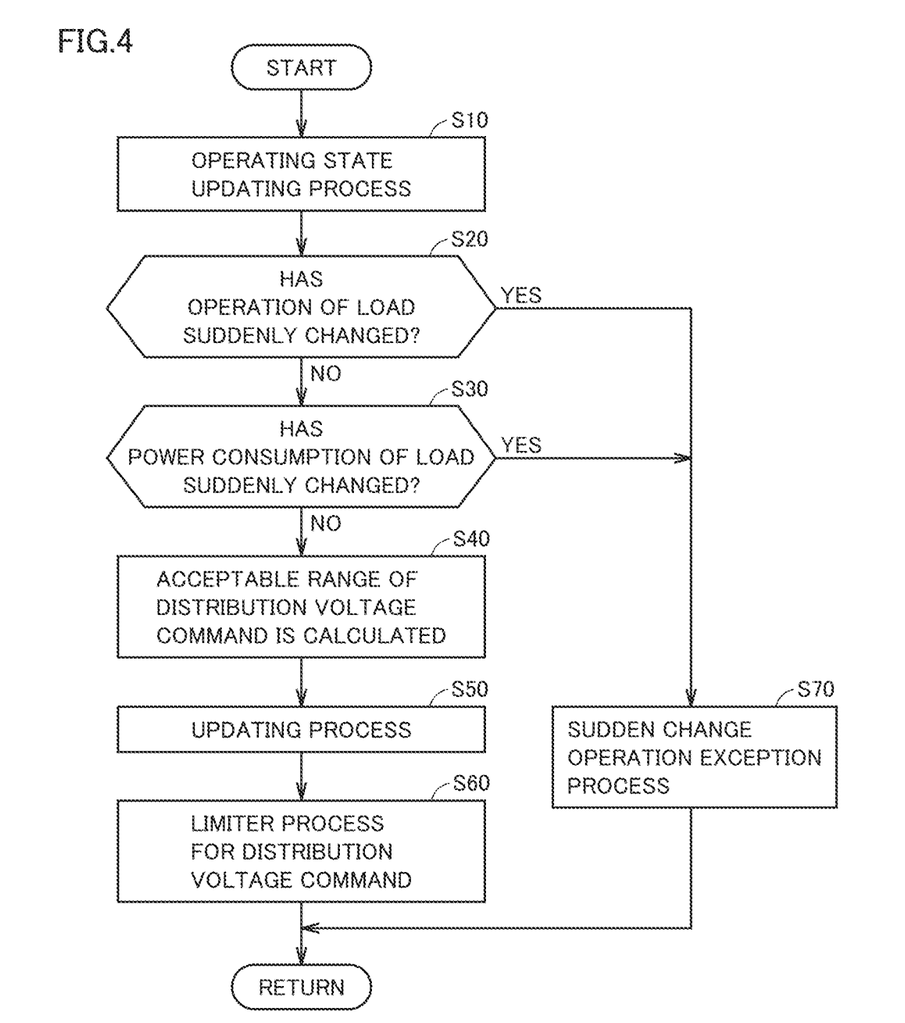
FIG. 4 is a first flowchart showing an exemplary process of a command generator.

FIG. 4 is a flowchart showing an exemplary process performed when command generator 30 generates distribution voltage command Vref. This flowchart is repeatedly performed every time a predetermined condition is satisfied (for example, in predetermined cycles).

First, command generator 30 performs a process of updating operating information of a plurality of loads 3 (step S10). For example, command generator 30 acquires voltage and current of DC system L, power information at a measurement point, operation commands of loads 3, and the like from load state detector 20 and stores the acquired information into a memory. The load operating information recorded in a computation cycle this time is used as the previous value of load operating information in the next computation cycle.

Subsequently, command generator 30 determines whether a state of load 3 has suddenly changed (steps S20 and S30). Specifically, command generator 30 determines whether the amount of variation in operation of load 3 (command value or detection value of operation) exceeds a threshold (step S20) and determines whether the amount of variation in power consumption of load 3 exceeds a threshold Pth1 (step S30).

If there is no significant variation in operation and power consumption of load 3 (NO at step S20 and NO at step S30), command generator 30 performs a process of calculating an acceptable range of distribution voltage command Vref (step S40).

Figure 5:
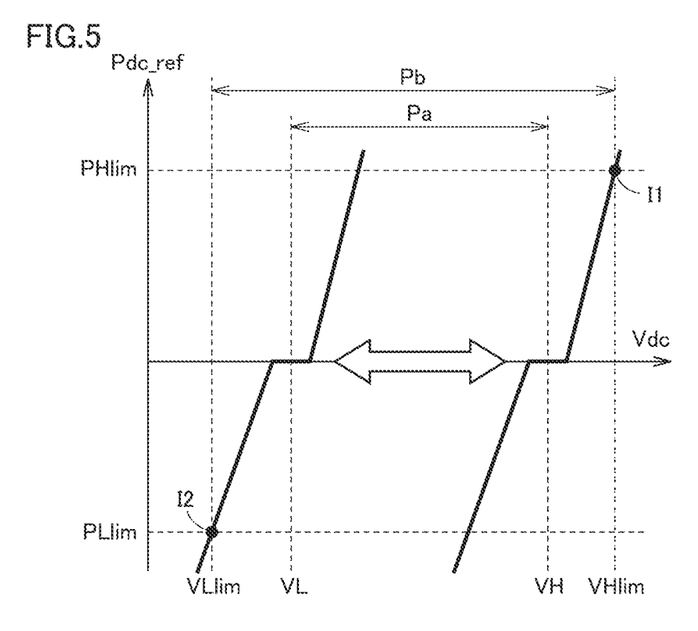
FIG. 5 is a diagram conceptually showing a method of determining an acceptable range of a distribution voltage command Vref.

FIG. 5 is a diagram conceptually showing a method of determining an acceptable range of distribution voltage command Vref. Command generator 30 according to the present embodiment calculates an acceptable range of distribution voltage command Vref, based on the control characteristics (droop characteristics) of power conversion device 10 and load operating information.

Specifically, when a point of intersection of an output power upper limit PHlim and a distribution voltage upper limit VHlim of power conversion device 10 is "intersection point I1", command generator 30 sets an upper limit VH to distribution voltage command Vdc_ref (the center value of the dead zone) in the case where the droop characteristics line DL of DC voltage controller 212 passes through intersection point I1. Similarly, when a point of intersection of an output power lower limit PLlim and a distribution voltage lower limit VLlim of power conversion device 10 is "intersection point I2", command generator 30 sets a lower limit VL to distribution voltage command Vdc_ref (the center value of the dead zone) in the case where the droop characteristics line DL of DC voltage controller 212 passes through intersection point I2. Command generator 30 then sets an acceptable range of distribution voltage command Vref to a range Ra from lower limit VL to upper limit VH. In this way, unstable operation can be prevented by setting an acceptable range of distribution voltage command Vdc_ref using the droop characteristics of DC voltage controller 212, and limiting distribution voltage command Vdc_ref to fall within the set acceptable range.

Output power lower limit PLlim and output power upper limit PHlim of power conversion device 10 are preset based on the preset power maximum value Pmax and power minimum value Pmin or the rated output capacity of power supply system 1.

When load 3 is a power load such as a motor, an acceptable range of distribution voltage command Vref may be calculated as follows. When load 3 is a power load such as a motor, the voltage required for load 3 may vary greatly with the operating state of load 3. This is because induced voltage from a motor that is a power load varies greatly with the rotation speed of the motor. In view of this, when load 3 is a power load such as a motor, command generator 30 may calculate distribution voltage upper limit VHlim and distribution voltage lower limit VLlim, for example, based on the operating state of the power load (for example, the rotation speed of the motor) and sets an acceptable range of distribution voltage command Vref to a range Rb from distribution voltage upper limit VHlim to distribution voltage lower limit VLlim. When load 3 is a general load, the voltage required for load 3 less varies with the operating state of load 3. In view of this, an acceptable range of distribution voltage command Vref may be predetermined fixed values according to the specifications of load 3.

Returning to FIG. 4, after an acceptable range of distribution voltage command Vref is calculated at step S40, command generator 30 performs a process of updating distribution voltage command Vref (step S50). In this step, effect verification is performed as to whether power consumption of load 3 has been reduced by varying distribution voltage command Vref in the previous computation cycle, and it is determined whether the updating direction of distribution voltage command Vref is set to the increasing direction or the decreasing direction, in accordance with the result of verification. Specifically, command generator 30 compares the value of load operating information this time with the previous value of load operating information and determines the variation direction of the power consumption of load 3. Then, if the power consumption of load 3 is reduced or not changed, distribution voltage command Vref is varied in the same direction as the previous one. If the power consumption of load 3 is increased, the distribution voltage command value Vref is varied in a direction opposite to the previous one.

For example, command generator 30 updates distribution voltage command Vref as follows. If the power consumption of load 3 is reduced or not changed, distribution voltage command Vref is updated as indicated by the following Equation (1).

$$Vref = Vref + \Delta V \times F \quad (1)$$

On the other hand, if the power consumption of load 3 is increased, the sign of an adjustment direction flag F is reversed as indicated by the following Equation (2) and distribution voltage command Vref is updated as indicated by the following Equation (3).

$$F = F \times (-1) \quad (2)$$

$$Vref = Vref + \Delta V \times F \quad (3)$$

In Equation (1) and Equation (3), "Vref" in the left side is distribution voltage command Vref after update, "Vref" in the right side is distribution voltage command Vref before update, and "$\Delta V$" is a predetermined minute voltage. "F" in the right side is the adjustment direction flag, which is a parameter for determining the updating direction of distribution voltage command Vref. The initial value of adjustment direction flag F can be set to "1" or "−1".

In this way, when the power consumption of load 3 is reduced or not changed, distribution voltage command Vref can be varied in the same direction as the previous one, and when the power consumption of load 3 is increased, distribution voltage command Vref can be varied in a direction opposite to the previous one. With such a process repeated, distribution voltage command Vref can be adjusted such that the power consumption of load 3 is minimized (minimal).

After the process of updating distribution voltage command Vref is performed at step S50, command generator 30 performs a limiter process for distribution voltage command Vref (step S60). Specifically, when distribution voltage command Vref after update calculated at step S50 does not fall within the acceptable range calculated at step S40, command generator 30 limits distribution voltage command Vref such that distribution voltage command Vref falls within the acceptable range.

Distribution command generator 30 updates distribution voltage command Vref in a direction to reduce the power consumption of load 3 by comparing the value of load operating information this time with the previous value.

Therefore, if distribution voltage command Vref is fixed to upper limit VH or lower limit VL of the acceptable range by the limiter process, the operating state information does not change to make comparison of power consumption variation of loads 3 difficult. It is therefore preferable to prevent distribution voltage command Vref from being fixed to upper limit VH or lower limit VL in the limiter process.

In the process at step S60, therefore, the following process is performed using upper limit VH or lower limit VL so that distribution voltage command Vref is not fixed to upper limit VH or lower limit VL.

When distribution voltage command Vref is less than lower limit VL, the sign of adjustment direction flag F is reversed as indicated by the following Equation (4) and distribution voltage command Vref is updated as indicated by the following Equation (5).

$$F=F\times(-1) \quad (4)$$

$$Vref=VL+(\Delta V\times F) \quad (5)$$

On the other hand, when distribution voltage command Vref exceeds upper limit VH, the sign of adjustment direction flag F is reversed as indicated by the following Equation (6) and distribution voltage command Vref is updated as indicated by the following Equation (7).

$$F=F\times(-1) \quad (6)$$

$$Vref=Vlimhi+(\Delta V\times F) \quad (7)$$

A series of processes described above is repeatedly performed at predetermined cycles, whereby the distribution voltage can be adjusted such that power consumption of load 3 is reduced in power supply system 1, thereby contributing to improvement in power distribution efficiency.

With such processes repeated, distribution voltage command Vref is adjusted in a range included in the acceptable range such that the power consumption of load 3 is minimized (minimal).

In the present embodiment, distribution voltage command Vref is adjusted such that the actual power consumption of load 3 is minimized (minimal), and therefore, even when the characteristics of load 3 have changed due to the connection environment between load 3 and power supply system 1 or degradation of load 3 over time, the change can be followed.

The process performed when it is determined that a state of load 3 has suddenly changed at steps S20 and S30 will now be described. If there is a significant variation in the operation command for load 3 (YES at step S20) or if there is a significant variation in power consumption of load 3 (YES at step S30), command generator 30 performs a sudden change operation exception process (step S70).

If the kinds of load 3 include a motor such as a compressor of an air conditioner and the rotation speed of the motor as a main functional part increases abruptly, the voltage to be distributed to load 3 also increases abruptly, which may cause unstable operation and deterioration in control characteristics. Therefore, if it is determined that a state of load 3 has suddenly changed at steps S20 and S30, command generator 30 performs a sudden change operation exception process at step S70 for resetting a distribution voltage as an exception operation. Lower limit VL of the acceptable range set at step S40 is a lower limit voltage for a steady operation, and applying lower limit VL for a steady operation as it is to a transient response may cause deterioration of control characteristics such as overshoot. At step S70, therefore, distribution voltage command Vref is set at a voltage larger than lower limit VL.

For example, when the rotation speed (command value or detection value) of a motor serving as load 3 is monitored at step S20, and if there is an abrupt increase such that increase of the rotation speed of the motor exceeds a threshold (YES at step S20), command generator 30 performs a sudden change operation exception process at step S70. The "threshold" used for determining an abrupt increase of the rotation speed of the motor can be preset according to the specifications of load 3.

For example, if there is an abrupt change such that the amount of change of power consumption of load 3 exceeds a preset threshold Pth1 at step S30 (YES at step S20), command generator 30 performs a sudden change operation exception process at step S70. The "threshold Pth1" used for determining a sudden change of power consumption of load 3 can be preset by the user in accordance with the kind of load 3, and the like.

In the sudden change operation exception process at step S70, command generator 30 temporarily stops the control of optimizing distribution voltage command Vref such that power consumption of load 3 is minimized (step S50) and performs a process of updating distribution voltage command Vref to a fixed value preset based on the specifications of load 3 and the like. This can prevent unstable operation when a state of load 3 suddenly changes. Distribution voltage command Vref may be updated using a distribution voltage command received by load state detector 20 from the load 3 side.

As described above, in power supply system 1 according to the present embodiment, while output powers of a plurality of power conversion devices 10 connected in parallel are leveled out, power consumption of load 3 can be reduced by adjusting the distribution voltage in accordance with an operating state of load 3.

Second Embodiment

The configuration of a power supply system 1A according to a second embodiment will now be described. Power supply system 1A differs in that power conversion device 10 in power supply system 1 described above is changed to a power conversion device 10A shown in FIG. 6. The other configuration of power supply system 1A is the same as power supply system 1 described above.

Figure 6:
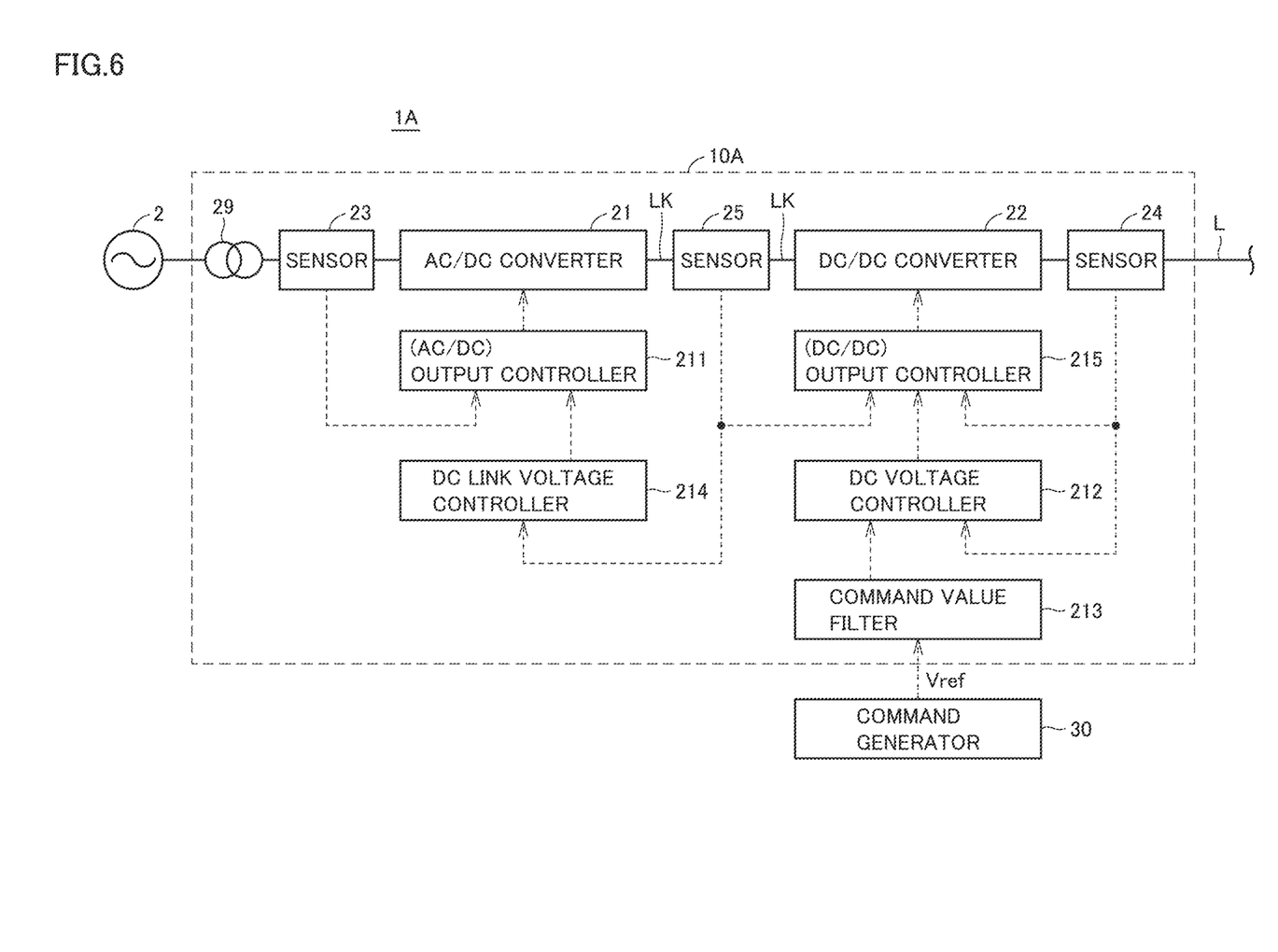
FIG. 6 is a second diagram schematically showing an exemplary configuration of the power conversion device.

FIG. 6 is a diagram schematically showing an exemplary configuration of power conversion device 10A in power supply system 1A according to the present embodiment. Power conversion device 10A differs from power conversion device 10 shown in FIG. 2 described above in that it additionally includes a DC link LK, a DC/DC converter 22, a sensor 25, a DC link voltage controller 214, and an output controller 215.

DC link LK connects AC/DC converter 21 and DC/DC converter 22. Sensor 25 detects a state (voltage, current, etc.) of DC link LK and outputs the detection result to DC link voltage controller 214 and output controller 215.

AC/DC converter 21 controls the voltage of DC link LK in accordance with the operation of DC link voltage controller 214 and output controller 211 to stabilize operation. DC/DC converter 22 performs voltage control of DC system L in accordance with the operation of DC voltage controller 212 and output controller 215.

Figure 7:
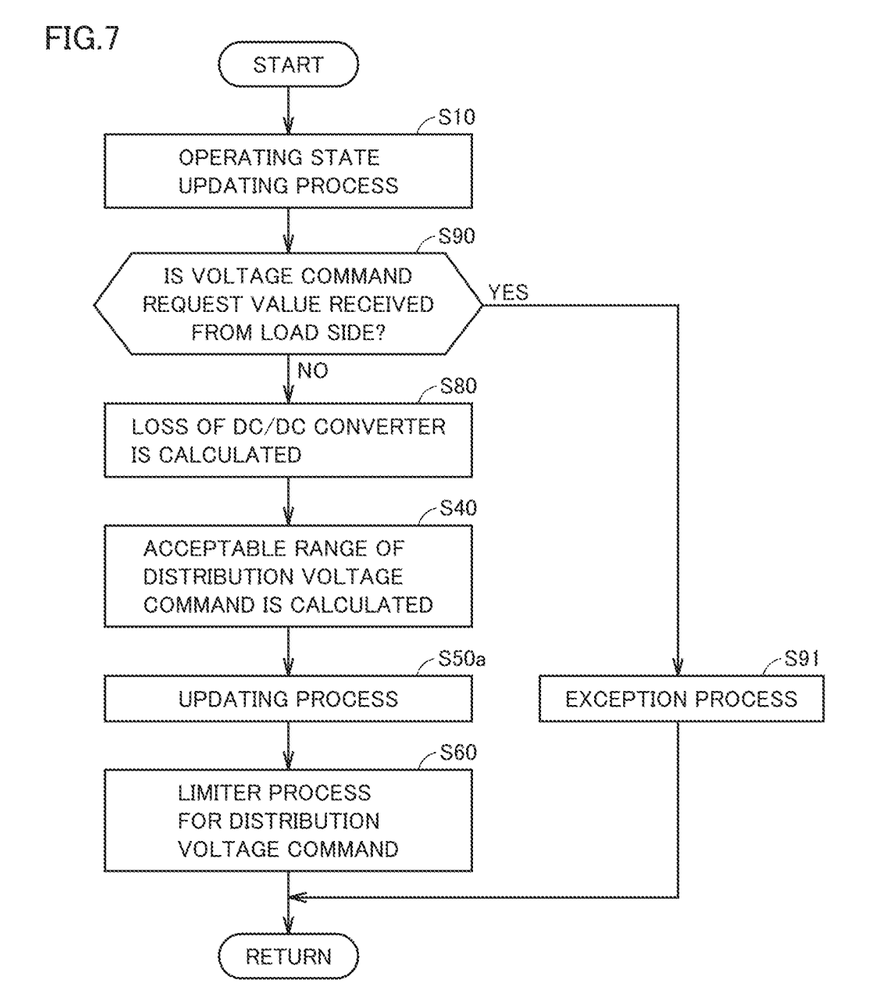
FIG. 7 is a second flowchart showing an exemplary process of the command generator.

FIG. 7 is a flowchart showing an exemplary process performed when command generator 30 according to the present embodiment generates distribution voltage command Vref. In the flowchart shown in FIG. 7, steps S90 and S91 are added instead of steps S20, S30, and S70 in the flowchart shown in FIG. 4, step S80 is added before the process at step S40, and step S50 is changed to step S50a. The other steps in FIG. 7 (the steps denoted by the same numerals as those of the steps shown in FIG. 4 described above) have already been described and will not be further elaborated.

At step S90, command generator 30 determines whether a distribution voltage request value is received from load 3 or an external device (a server or an energy management system (EMS), etc.) that outputs an operation command to load 3. Thus, command generator 30 according to the present embodiment is configured to perform communication with load 3 or an external device.

If a distribution voltage request value is received from load 3 or an external device (YES at step S90), command generator 30 performs an exception process of outputting the distribution voltage request value received from load 3 or an external device as it is as distribution voltage command Vref to command value filter 213 (step S91). That is, command generator 30 according to the present embodiment permits exceptional updating of distribution voltage command Vref only when a distribution voltage request value is received from load 3 or an external device.

On the other hand, if a distribution voltage request value is not received from load 3 or an external device (NO at step S90), command generator 30 calculates loss information of DC/DC converter 22 based on the voltage and current of DC system L acquired by load state detector 20 (step S80).

In the present embodiment, since there is no other device connected between load state detector 20 and a plurality of power conversion devices 10A and output currents of a plurality of power conversion devices 10A are leveled out, the operating states (for example, output voltage, output current) of DC/DC converters 22 of a plurality of power conversion devices 10A can be predicted based on the voltage and current of DC system L detected by load state detector 20. In the present embodiment, a loss map that defines the correspondence between the operating state of DC/DC converter 22 and loss of DC/DC converter 22 is recorded in advance in the memory of command generator 30. Based on these, command generator 30 predicts the operating state of DC/DC converter 22 based on the voltage and current of DC system L and calculates the loss of DC/DC converter 22 in the predicted operating state of DC/DC converter 22 by referring to the loss map.

Subsequently, at step S50a, command generator 30 compares the value of the sum of power consumption of load 3 and loss of DC/DC converter 22 this time with the previous value and generates distribution voltage command Vref such that the amount of power received by main power source 2 is reduced.

By doing so, in the present embodiment, distribution voltage command Vref can be adjusted in a direction to reduce the sum of power consumption of load 3 and loss of DC/DC converter 22. Therefore, the amount of power received by main power source 2 can be reduced considering the operating state and loss of power conversion device 10A, thereby reducing electricity costs.

Third Embodiment

Figure 8:
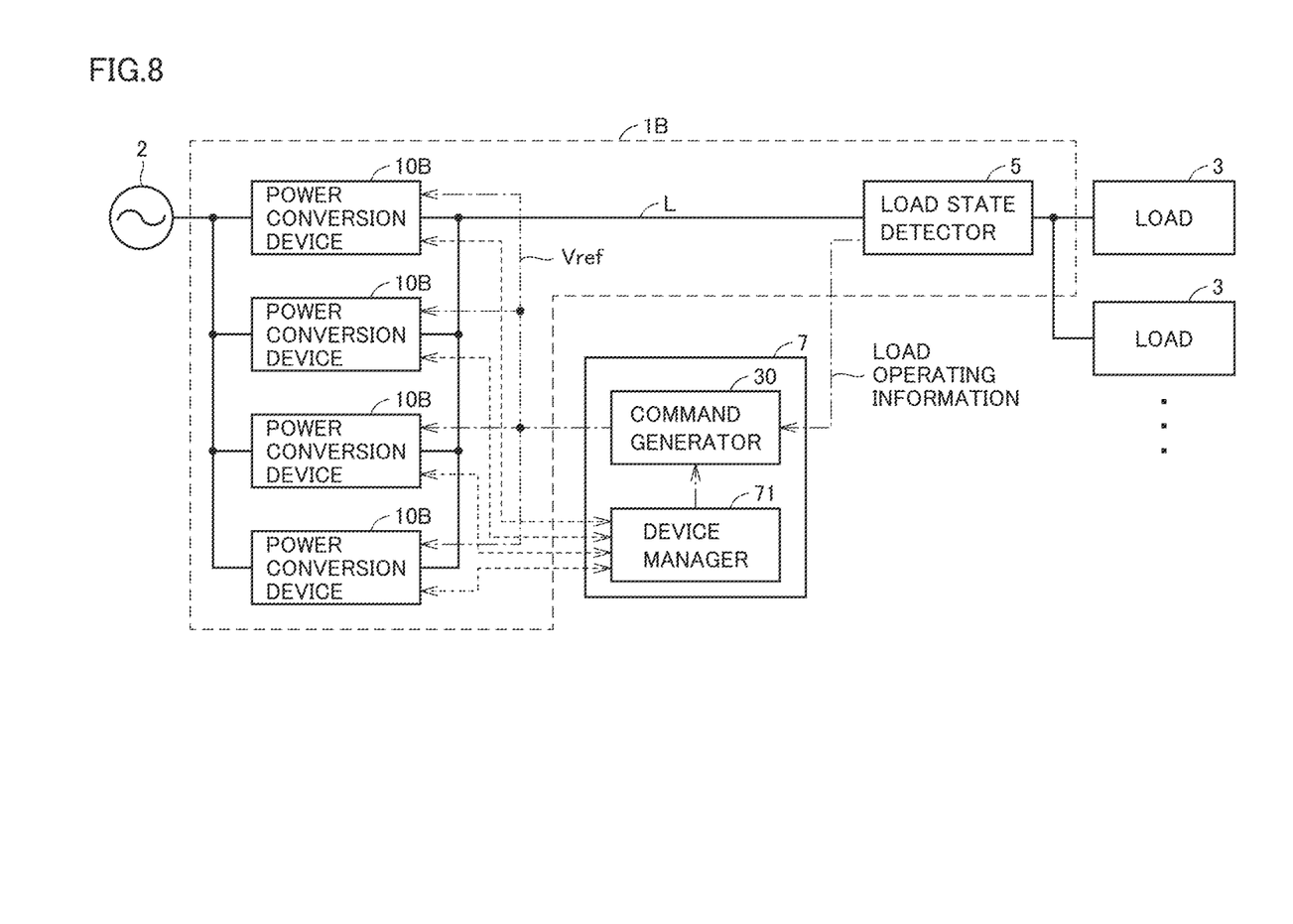
FIG. 8 is a second diagram schematically showing an exemplary configuration of the power supply system.

FIG. 8 is a diagram schematically showing an exemplary configuration of a power supply system 1B according to the present embodiment. In power supply system 1B, four power conversion devices 10B are connected in parallel and an external control device 7 is added, and external control device 7 includes a command generator 30 and a device manager 71. External control device 7 may be, for example, a server or an EMS describe above that outputs an operation command to load 3.

Figure 9:
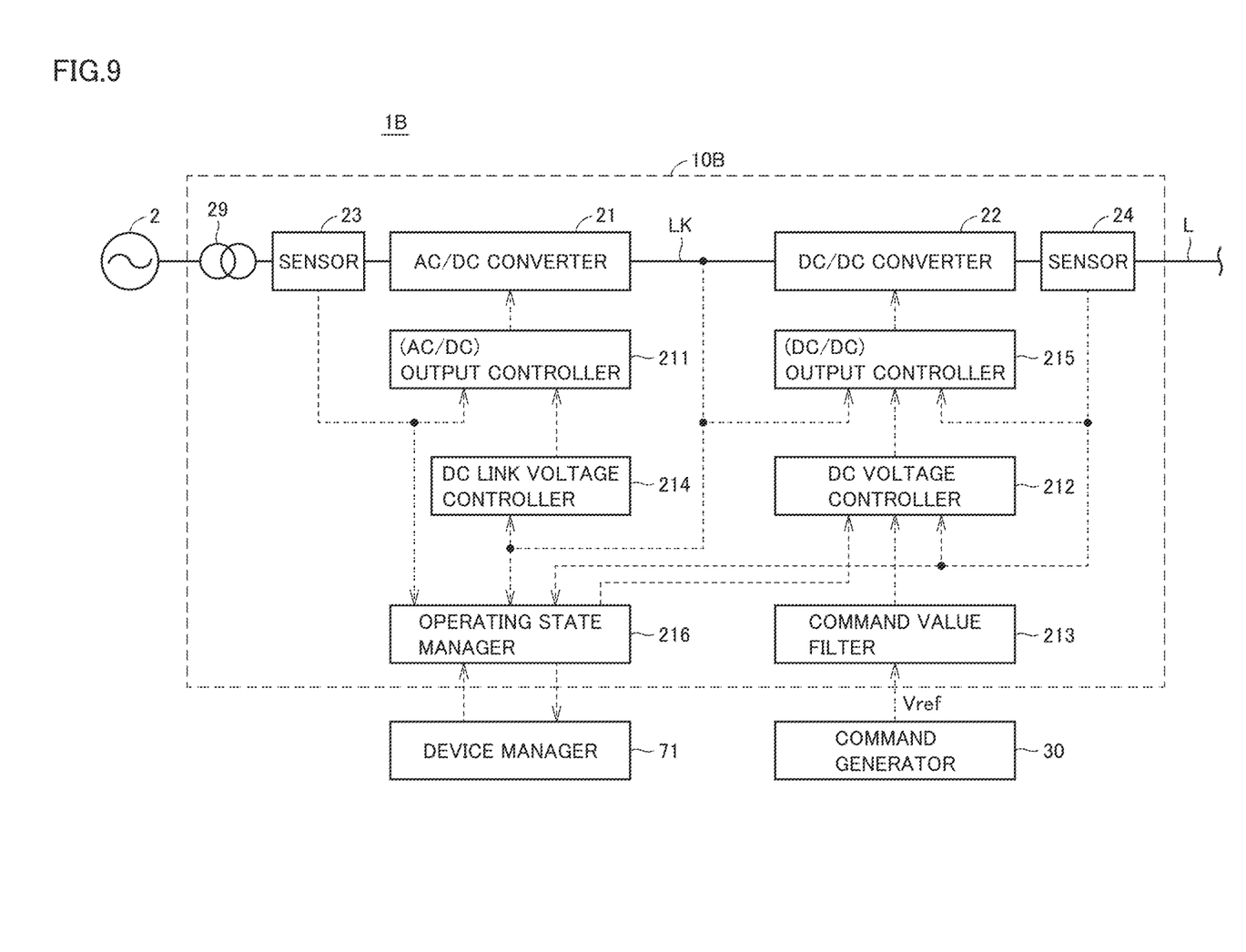
FIG. 9 is a third diagram schematically showing an exemplary configuration of the power conversion device.

FIG. 9 is a diagram schematically showing an exemplary configuration of power conversion device 10B according to the present embodiment. Power conversion device 10B differs from power conversion device 10A shown in FIG. 6 described above in that it additionally includes an operating state manager 216 that performs communication with device manager 71 of external control device 7.

For example, in a case where the output capacity per power conversion device 10B is 50 kW and the rated output capacity of loads 3 as a whole is 100 kW, in the present embodiment, even when two power conversion devices 10B among four power conversion devices 10B fail, the remaining two power conversion devices 10B perform rated operation to enable continuous operation of loads 3 as a whole.

Power supply system 1B of the present embodiment is a parallel redundancy system in which four power conversion devices 10B are connected in parallel and may ensure operation stability even when the droop characteristics in DC voltage controller 212 are varied with the number of operating power conversion devices 10B. In power conversion device 10B in FIG. 9, operating state manager 216 outputs information such as the number of operating power conversion devices 10B to DC voltage controller 212, based on information specified by device manager 71, and the like. DC voltage controller 212 can vary slope Kp and width d of the dead zone of the droop characteristics of DC voltage controller 212, based on information from operating state manager 216, even during operation of power conversion device 10B.

Command generator 30 according to the third embodiment performs a process mostly similar to the process by command generator 30 according to the second embodiment (the flowchart shown in FIG. 7 describe above). However, command generator 30 according to the present embodiment performs operation different from that of command generator 30 according to the second embodiment only at step S40 in FIG. 7. In the following, the process at step S40 by command generator 30 according to the third embodiment will be described.

The operation of command generator 30 according to the present embodiment differs from the operation shown in the flowchart in FIG. 7 described above only in the operation at step S40. The description is the same and only a modification in the process at step S40 by command generator 30 according to the present embodiment will be described.

Step S40 is a process of calculating an acceptable range Ra of distribution voltage command Vref. For the acceptable range Ra according to the present embodiment, upper limit VH and lower limit VL of the acceptable range Ra are calculated based on the control characteristics and number of operating devices information of power conversion devices 10B managed by device manager 71, and load operating information.

Even in the present third embodiment, like the other embodiments, upper limit VH of the acceptable range Ra is calculated based on intersection point I1 of output power upper limit PHlim and distribution voltage upper limit VHlim of power conversion device 10B, and lower limit VL of the acceptable range Ra is calculated based on intersection point I2 of output power lower limit PLlim and distribution voltage lower limit VLlim of power conversion device 10B. However, in the present third embodiment, the values of output power upper limit PHlim and output power lower limit PLlim of power conversion device 10B change with the operating state of power conversion device 10B.

The following Equations (8) and (9) show an example of calculation formulas of output power upper limit PHlim and output power lower limit PLlim. In the following Equations (8) and (9), "Pr" is the rated power of loads 3 as a whole connected to DC system L, "Ab" is the number of power conversion devices 10B operating at present, and "Ar" is the number (preset value) of backup power conversion devices 10B for providing redundancy. When the number of operating power conversion devices 10B changes due to failure or the like, it is necessary to promptly update the acceptable range Ra.

$$PHlim = Pr \div (Ab - Ar) \quad (8)$$

$$PLlim = (-1) \times Pr \div (Ab - Ar) \quad (9)$$

With the setting above, the acceptable range Ra can be expanded in accordance with the number of power conversion devices 10B operating at present. The setting of distribution voltage command Vref therefore can be flexible, and the efficiency of power distribution to loads 3 can be increased.

Fourth Embodiment

Figure 10:
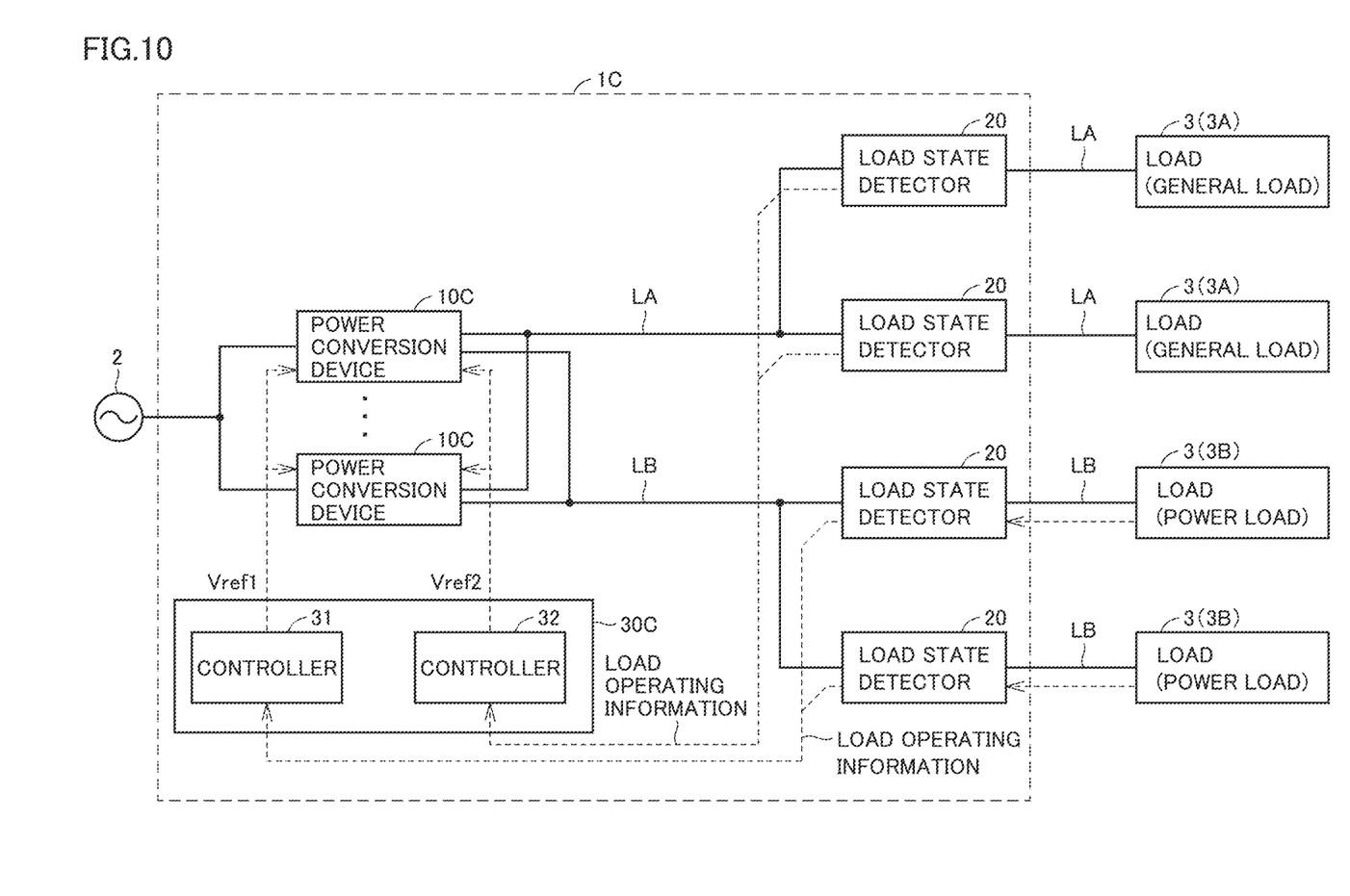
FIG. 10 is a third diagram schematically showing an exemplary configuration of the power supply system.

FIG. 10 is a diagram schematically showing an exemplary configuration of a power supply system 1C according to a fourth embodiment. Power supply system 1C includes a plurality of DC systems LA and LB, a plurality of power conversion devices 10C, and a command generator 30C. A plurality of power conversion devices 10C convert the power received from main power source 2 into different DC powers based on the corresponding distribution voltage commands and supply the converted DC powers to DC systems LA and LB. Command generator 30C includes controllers 31 and 32 corresponding to a plurality of DC systems LA and LB.

Power conversion device 10C may use a device that converts the power received from main power source 2 directly into a plurality of DC powers or may convert the received power into one or more DC powers with a power converter and include a distribution device in the power converter to further converts the power into a plurality of DC powers.

A plurality of DC systems LA and LB are provided, for example, for each kind of loads 3, and loads 3 connected to the same DC system are of the same kind. The operating characteristics differ with the kinds of loads 3, and the suitable distribution voltages also differ. In a power supply system having only a single DC system, loads 3 of different kinds are connected to the same system, and therefore, it is difficult to adjust the distribution voltage of each individual load 3. In comparison, in power supply system 1C having a plurality of DC systems LA and LB, a DC system is easily configured and routed for each kind of loads 3, and a distribution voltage suitable for each individual load 3 is easily supplied. FIG. 10 shows an example in which a plurality of general loads 3A are connected to DC system LA, and a plurality of power loads 3B are connected to DC system LB.

With the function of power conversion device 10C or a distributor included in power conversion device 10C, supply powers to a plurality of DC systems LA and LB can be controlled independently of each other. Therefore, the determination method for the corresponding command generator 30C and the calculation method for distribution voltage command Vref can be set individually, depending on the kind of loads 3 connected to DC systems LA and LB, so that the operation of command generator 30C can be easily adjusted for the kind of loads 3.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 1, 1A, 1B, 1C power supply system, 2 main power source, 3 load, 3A general load, 3B power load, 7 external control device, 10, 10A, 10B, 10C power conversion device, 20 load state detector, 21 AC/DC converter, 22 DC/DC converter, 23, 24, 25 sensor, 29 transformer, 30, 30C command generator, 31, 32 controller, 71 device manager, 211, 215 output controller, 212 DC voltage controller, 213 command value filter, 214 DC link voltage controller, 216 operating state manager, DL droop characteristics line, L, LA, LB DC system, LK DC link.

The invention claimed is:

1. A power supply system to convert power received from a main power source to supply AC power or DC power, and output the converted power to a DC system, the power supply system comprising:
    a plurality of power conversion devices provided between the main power source and the DC system and connected in parallel with each other;
    a state detector to detect an operating state of at least one load connected to the DC system; and
    a command generator to generate a voltage command that is a command value of voltage distributed from the power supply system to the DC system,
    each of the power conversion devices including
        a voltage controller to generate a power command based on a voltage of the DC system and the voltage command, and
        a converter to convert power received from the main power source based on the power command and output the converted power to the DC system,
    wherein the command generator generates the voltage command such that loss of the at least one load connected to the DC system is reduced, based on a detection result of the state detector.

2. The power supply system according to claim 1, wherein the voltage controller sets droop characteristics that define characteristics of the power command for the voltage of the DC system, based on the voltage command, and generates the power command from the set droop characteristics and the voltage of the DC system.

3. The power supply system according to claim 2, wherein the voltage controller sets the droop characteristics such that a dead zone in which the power command does not vary even when the voltage of the DC system varies is formed in a region including the voltage command.

4. The power supply system according to claim 2, wherein the command generator sets a limit value of the voltage command based on the droop characteristics of the voltage controller and an operating state of the power conversion devices.

5. The power supply system according to claim 1, wherein the command generator adjusts the voltage command in a direction to reduce a sum of loss of the power conversion devices and power consumption of the load, based on loss information of the power conversion devices stored in advance and a detection result of the state detector.

6. The power supply system according to claim 1, wherein when a voltage request value for the load is received from a source external to the power supply system, the command generator sets the received voltage request value as the voltage command.

7. The power supply system according to claim 1, wherein the power supply system is configured to supply power to a plurality of DC systems, and
the command generator generates a plurality of voltage commands respectively corresponding to the DC systems.

8. The power supply system according to claim 1, wherein the each of the power conversion devices include a transformer connected between the main power source and the converter to insulate the main power source from the converter.

9. The power supply system according to claim 8, wherein the converter is an AC/DC converter.

10. The power supply system according to claim 8, wherein the each of the power conversion devices include a first sensor disposed between the transformer and the converter to detect a voltage and current of power supplied by the main power source.

11. The power supply system according to claim 10, wherein the each of the power conversion devices includes a second sensor disposed between the converter and the DC system to detect a voltage and current of the DC system.

12. The power supply system according to claim 1, wherein the main power source is an AC power source.

13. The power supply system according to claim 1, wherein the at least one load includes lighting, office automation devices, or air conditioning loads.

* * * * *